(12) United States Patent
Damnjanovic et al.

(10) Patent No.: US 9,780,900 B2
(45) Date of Patent: Oct. 3, 2017

(54) METHOD AND APPARATUS FOR INFERRING USER EQUIPMENT INTERFERENCE SUPPRESSION CAPABILITY FROM MEASUREMENTS REPORT

(71) Applicant: QUALCOMM Incorporated, San Diego, CA (US)

(72) Inventors: Aleksandar Damnjanovic, Del Mar, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/497,007

(22) Filed: Sep. 25, 2014

(65) Prior Publication Data
US 2015/0009794 A1 Jan. 8, 2015

Related U.S. Application Data

(63) Continuation of application No. 13/082,124, filed on Apr. 7, 2011.
(Continued)

(51) Int. Cl.
*H04J 11/00* (2006.01)
*H04W 24/10* (2009.01)
*H04W 72/08* (2009.01)

(52) U.S. Cl.
CPC ........... *H04J 11/005* (2013.01); *H04W 24/10* (2013.01); *H04W 72/082* (2013.01)

(58) Field of Classification Search
CPC .................................................. H04J 11/005
See application file for complete search history.

(56) References Cited

U.S. PATENT DOCUMENTS

2005/0169217 A1* 8/2005 Pan ............................. 370/335
2007/0149242 A1 6/2007 Kim et al.
(Continued)

FOREIGN PATENT DOCUMENTS

| CN | 1905730 A | 1/2007 |
|---|---|---|
| CN | 101128010 A | 2/2008 |

(Continued)

OTHER PUBLICATIONS

3GPP TR 25.814: Physical layer aspect for evolved Universal Terrestrial Radio Access (UTRA), Jun. 15, 2006 (Jun. 15, 2006), pp. 1-126, XP55001467, http://www.3gpp.org/ftp/Specs/archive/25_series/25.814/ [retrieved on Jun. 28, 2011].
(Continued)

*Primary Examiner* — Brian D Nguyen
*Assistant Examiner* — Toan Nguyen
(74) *Attorney, Agent, or Firm* — Hyung G. Myung

(57) ABSTRACT

UE that are able to cancel interference from CRS, a PDSCH, a PDCCH, or a PCFICH may do so without explicitly signaling the capability to the serving eNB. The serving eNB may transmit to the UE a plurality of cell identifiers to indicate from which cells interference should be canceled. The UE receives CRS, PDSCH, PDCCH, or PCFICH from the serving eNB and cancels CRS, PDSCH, PDCCH, or PCFICH interference, respectively from the signal received from the eNB. The UE cancels the interference from the cells that correspond to the cell identifiers. The UE may then transmit a report to the eNB with a quality measurement without the interference.

25 Claims, 15 Drawing Sheets

Related U.S. Application Data

(60) Provisional application No. 61/323,766, filed on Apr. 13, 2010.

(56) References Cited

U.S. PATENT DOCUMENTS

| | | |
|---|---|---|
| 2007/0189304 A1 | 8/2007 | Rosa |
| 2008/0003965 A1* | 1/2008 | Saily et al. ............... 455/226.2 |
| 2008/0009256 A1* | 1/2008 | Anderson .................... 455/296 |
| 2008/0108363 A1* | 5/2008 | Yu et al. ...................... 455/450 |
| 2008/0123615 A1 | 5/2008 | Hoshino et al. |
| 2008/0123760 A1* | 5/2008 | Oh et al. ........................ 375/260 |
| 2009/0088172 A1 | 4/2009 | Lusky et al. |
| 2010/0009634 A1 | 1/2010 | Budianu et al. |
| 2010/0009677 A1 | 1/2010 | Karabinis et al. |
| 2010/0020771 A1* | 1/2010 | Ji .......................... H04L 1/0004 370/336 |
| 2010/0075689 A1 | 3/2010 | Uemura et al. |
| 2010/0093364 A1 | 4/2010 | Ribeiro et al. |
| 2010/0099450 A1* | 4/2010 | Lu et al. ...................... 455/501 |
| 2010/0203887 A1* | 8/2010 | Kim ........................ H04W 4/08 455/434 |
| 2010/0331009 A1 | 12/2010 | Krishnamurthy et al. |
| 2011/0188558 A1 | 8/2011 | Nagata et al. |
| 2011/0222525 A1* | 9/2011 | Kishigami et al. ............ 370/343 |
| 2011/0286346 A1 | 11/2011 | Barbieri et al. |
| 2012/0082022 A1 | 4/2012 | Damnjanovic et al. |

FOREIGN PATENT DOCUMENTS

| | | |
|---|---|---|
| EP | 2237460 A1 | 10/2010 |
| JP | 2003174431 A | 6/2003 |
| JP | 2010035233 A | 2/2010 |
| JP | 2010518686 A | 5/2010 |
| RU | 2340094 C2 | 11/2008 |
| WO | WO-2005089004 A1 | 9/2005 |
| WO | WO-2007085947 A2 | 8/2007 |
| WO | WO-2008097181 A2 | 8/2008 |
| WO | WO-2009081514 A1 | 7/2009 |
| WO | WO-2010005639 A2 | 1/2010 |
| WO | WO-2010006874 A2 | 1/2010 |
| WO | WO-2011130409 A1 | 10/2011 |

OTHER PUBLICATIONS

Huawei, "The Standardization Impacts of Downlink CoMP", 3GPP TSG RAN WG1 meeting #59bis, R1-100258, 2010. 1. 18, pp. 1-3.
International Search Report and Written Opinion—PCT/US2011/032374, ISA/EPO—Sep. 6, 2011.
NEC Group: "Downlink control signaling support for SU/MU-MIMO", 3GPP Draft; R1-094730-MU-MIM0_Signaling, 3rd Generation Partnership Project (3GPP), Mobile Competence Centre; 650, Route Des Lucioles; F-06921 Sophia-Antipolis Cedex ; France, No. Jeju; Nov. 9, 2009, Nov. 9, 2009 (Nov. 9, 2009), XP050389127, [retrieved on Nov. 3, 2009].
NTT DOCOMO: "Interference Coordination for Non-CA-based Heterogeneous Networks", 3GPP Draft; R1-102307 ICIC for NON-CA Hetnet, 3rd Generation Partnership Project (3GPP), Mobile Competence Centre; 650, Route Des Lucioles; F-06921 Sophia-Antipolis Cedex; France, vol. RAN WG1, No. Beijing, china; Apr. 12, 2010, Apr. 7, 2010 (Apr. 7, 2010), pp. 1-11, XP050419698, [retrieved on Apr. 7, 2010].
Panasonic: "Possibility of UE side ICI cancellation in Hetnet," 3GPP TSG RAN WG1 Meeting #60bis, R1-102046, 2010. 4. 6.<http://www.3gpp.org/ftp/tsg_ran/WG1_RL1/TSGR1_60b/Docs>.
Qualcomm Incorporated: "Measurements and feedback extensions for improved operations in HetNets", 3GPP TSG-RAN WG1#60b R1-102353,<URL:http://www.3gpp.org/ftp/tsg_ran/WG1_RL1/TSGR1_60b/Docs/R1-102353.zip>, Apr. 6, 2010, 3 Pages.

* cited by examiner

METHOD AND APPARATUS FOR INFERRING USER EQUIPMENT INTERFERENCE SUPPRESSION CAPABILITY FROM MEASUREMENTS REPORT

CROSS-REFERENCE TO RELATED APPLICATION(S)

The present Application is a Continuation of U.S. application Ser. No. 13/082,124, filed Apr. 7, 2011, entitled "Method and Apparatus for Inferring User Equipment Interference Suppression Capability From Measurements Report," which claims the benefit of U.S. Provisional Application Ser. No. 61/323,766, filed Apr. 13, 2010, entitled "Method and Apparatus for Inferring UE Interference Suppression Capability from Measurements Report," which is expressly incorporated by reference herein in its entirety.

BACKGROUND

Field

The present disclosure relates generally to communication systems, and more particularly, to inferring user equipment interference suppression capability from radio resource management (RRM) reports.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

User equipment (UE) that are able to cancel interference from cell-specific reference signals (CRS), a physical downlink shared channel (PDSCH), a physical downlink control channel (PDCCH), or a physical control format indicator channel (PCFICH) may do so without explicitly signaling the capability to the serving evolved Node B (eNB). The serving eNB may transmit to the UE a plurality of cell identifiers to indicate from which cells interference should be canceled. The UE receives CRS, PDSCH, PDCCH, or PCFICH from the serving eNB and cancels CRS, PDSCH, PDCCH, or PCFICH interference, respectively from the signal received from the eNB. The UE cancels the interference from the cells that correspond to the cell identifiers. The UE may then transmit a report to the eNB with a quality measurement without the interference.

In an aspect of the disclosure, a method, an apparatus, and a computer program product for wireless communication are provided in which at least one cell identifier is received. Each cell identifier corresponds to a cell from which interference should be canceled. In addition, interference received from cells corresponding to one or more of the at least one cell identifier is removed from a received signal. Furthermore, a report including a quality measurement of the received signal without the interference is transmitted.

In an aspect of the disclosure, a method, an apparatus, and a computer program product for wireless communication are provided in which at least one cell identifier is transmitted to a user equipment. Each cell identifier corresponds to a cell from which interference should be canceled. In addition, a signal is transmitted to the user equipment. Furthermore, a report including a quality measurement of the transmitted signal without the interference is received.

In an aspect of the disclosure, a method, an apparatus, and a computer program product for wireless communication are provided in which information is received. The information includes a radio network temporary identifier for each radio network from which at least one of a physical downlink control channel or a physical control format indicator channel is received, a control channel element aggregation level, and a relative power ratio between resource elements used for the at least one of the physical downlink control channel or the physical control format indicator channel and resource elements used for reference signals. In addition, interference is canceled based on the information.

DETAILED DESCRIPTION

Figure 1:
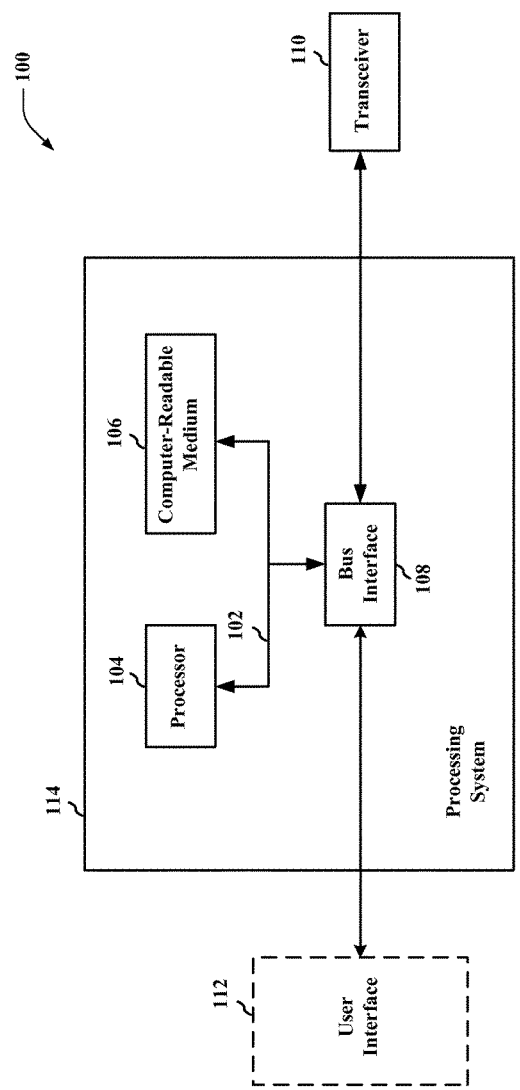
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

Processor 104 is responsible for managing bus 102 and general processing, including the execution of software stored on computer-readable medium 106. The software, when executed by processor 104, causes processing system 114 to perform the various functions described infra for any particular apparatus. Computer-readable medium 106 may also be used for storing data that is manipulated by processor 104 when executing software.

Figure 2:
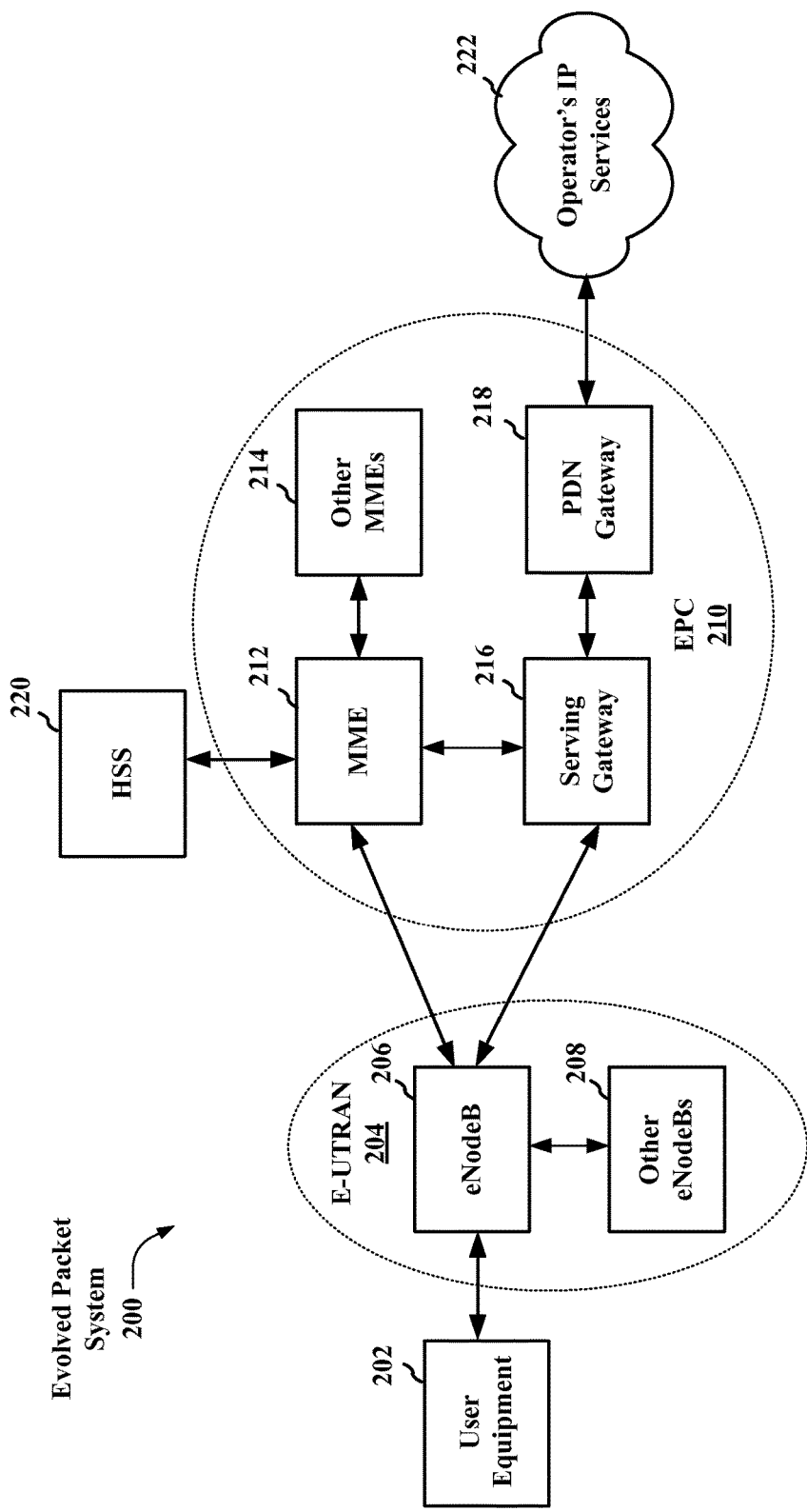
FIG. 2 is a diagram illustrating an example of a network architecture.

FIG. 2 is a diagram illustrating an LTE network architecture 200 employing various apparatuses 100 (See FIG. 1). LTE network architecture 200 may be referred to as an Evolved Packet System (EPS) 200. EPS 200 may include one or more user equipment (UE) 202, an Evolved UMTS Terrestrial Radio Access Network (E-UTRAN) 204, an Evolved Packet Core (EPC) 210, a Home Subscriber Server (HSS) 220, and an Operator's IP Services 222. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes evolved Node B (eNB) 206 and other eNBs 208. eNB 206 provides user and control plane protocol terminations toward UE 202. eNB 206 may be connected to the other eNBs 208 via a wired or wireless interface, which can include a X2 interface (i.e., backhaul) or wireless transmissions. eNB 206 may also be referred to by those skilled in the art as a base station, a base transceiver station, a radio base station, a radio transceiver, a transceiver function, a basic service set (BSS), an extended service set (ESS), or some other suitable terminology. eNB 206 provides an access point to EPC 210 for a UE 202. Examples of UEs 202 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. UE 202 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

eNB 206 is connected by a wired interface to EPC 210, which can include an S1 interface. EPC 210 can include a Mobility Management Entity (MME) 212, other MMEs 214, a Serving Gateway 216, and a Packet Data Network (PDN) Gateway 218. MME 212 is the control node that processes the signaling between UE 202 and EPC 210. Generally, MME 212 provides bearer and connection management. All user IP packets are transferred through Serving Gateway 216, which itself is connected to PDN Gateway 218. PDN Gateway 218 provides UE IP address allocation as well as other functions. PDN Gateway 218 is connected to Operator's IP Services 222. Operator's IP Services 222 may include or provide access to, for example, the Internet, an Intranet, an IP Multimedia Subsystem (IMS), and a PS Streaming Service (PSS).

Figure 3:
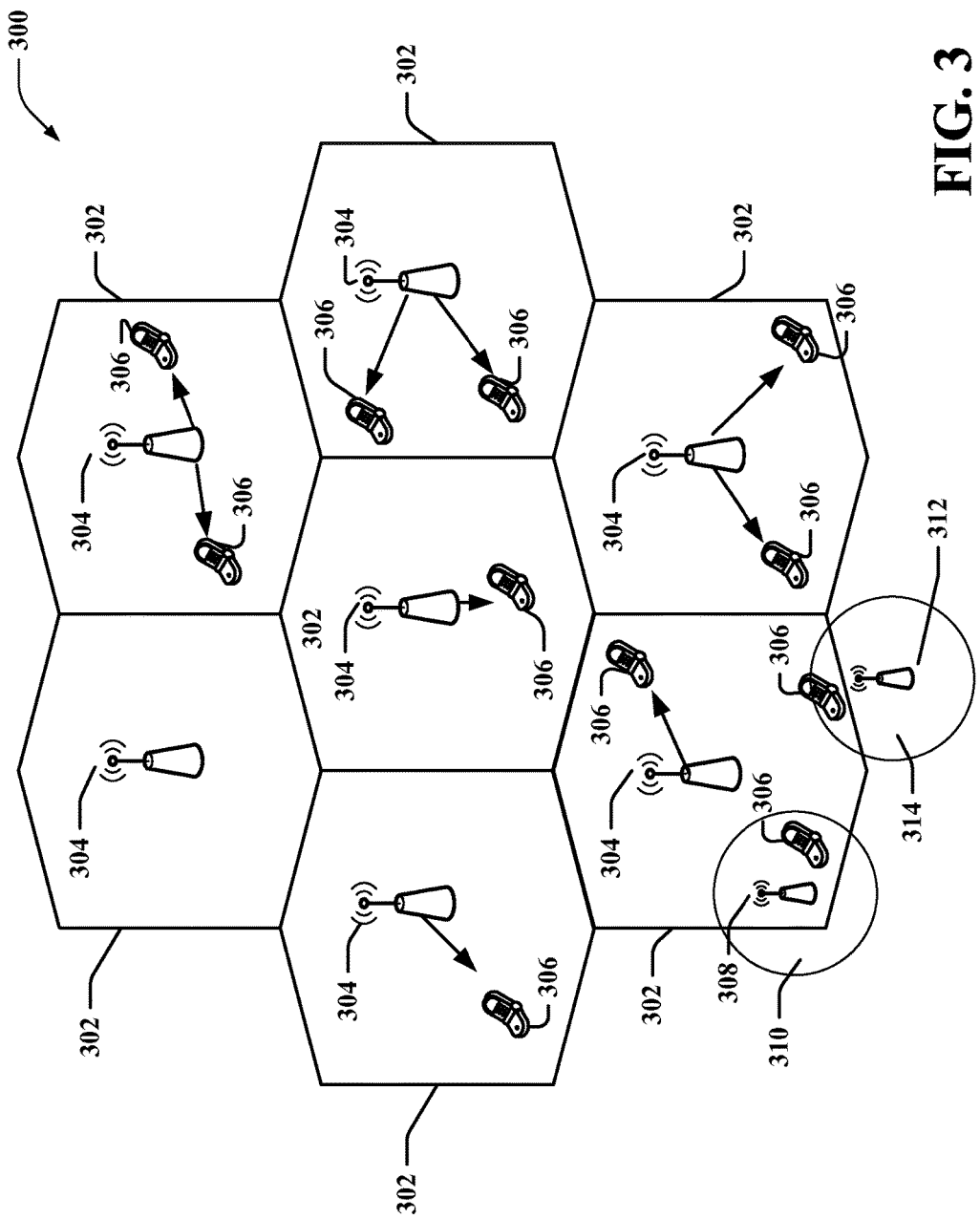
FIG. 3 is a diagram illustrating an example of an access network.

FIG. 3 is a diagram illustrating an example of an access network in an LTE network architecture. In this example, access network 300 is divided into a number of cellular regions (cells) 302. One or more lower power class eNBs 308, 312 may have cellular regions 310, 314, respectively, that overlap with one or more of cells 302. Lower power class eNBs 308, 312 may be femto cells (e.g., home eNBs (HeNBs)), pico cells, micro cells, or relays. A higher power class or macro eNB 304 is assigned to a cell 302 and is configured to provide an access point to EPC 210 for some portion or all the UEs in cell 302. There is no centralized controller in this example of an access network 300, but a centralized controller may be used in alternative configurations. eNB 304 performs radio related functions including radio bearer control, admission control, mobility control, scheduling, security, and connectivity to serving gateway 216 (see FIG. 2).

The modulation and multiple access scheme employed by access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

eNB 304 may have multiple antennas supporting MIMO technology. The use of MIMO technology enables eNB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream (i.e., applying an amplitude and phase scaling) and then transmitting each spatially precoded stream through multiple transmit antennas on the downlink. The spatially precoded data streams arrive at UE(s) 306 with different spatial signatures, which enables each of UE(s) 306 to recover the one or more data streams destined for that UE 306. On the uplink, each UE 306 transmits a spatially precoded data stream, which enables eNB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 4:
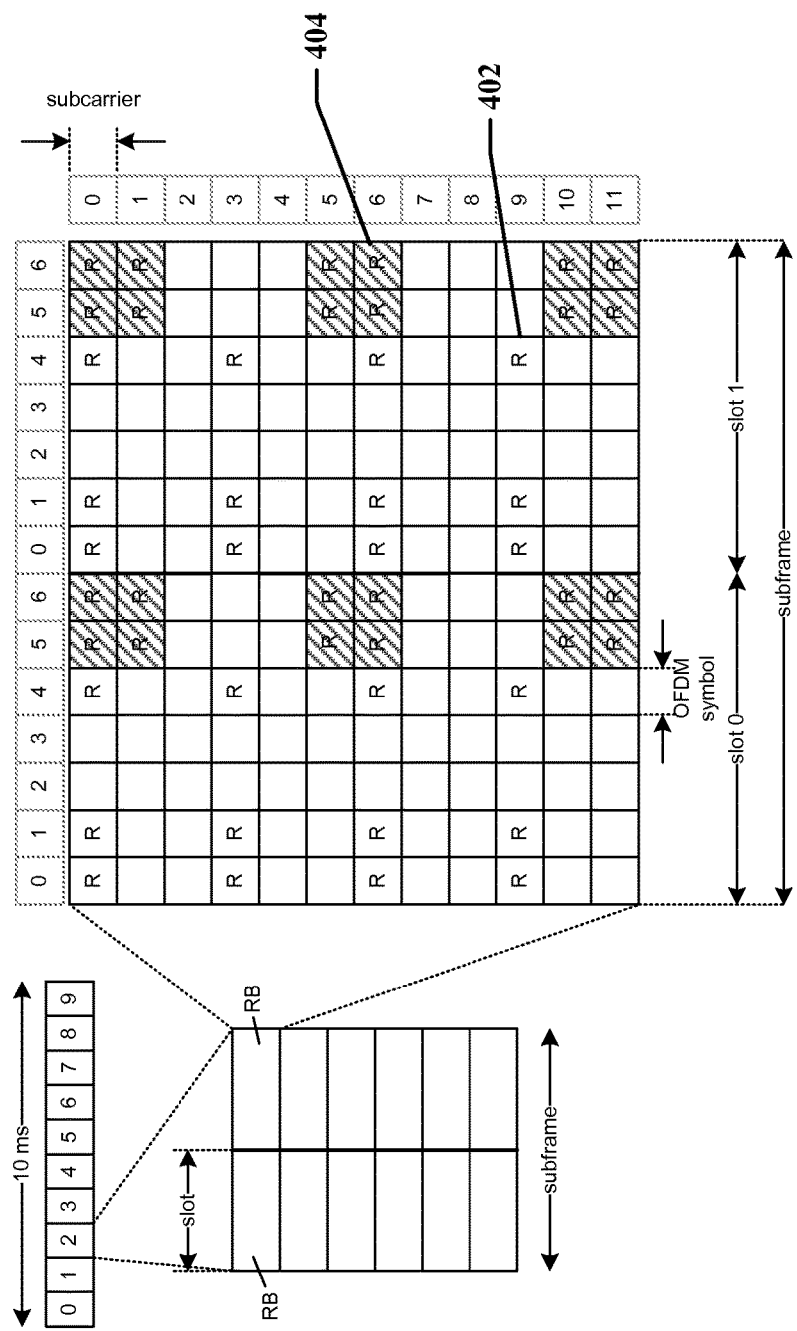
FIG. 4 is a diagram illustrating an example of a frame structure for use in an access network.

Various frame structures may be used to support the DL and UL transmissions. An example of a DL frame structure will now be presented with reference to FIG. 4. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as R 402, 404, include DL reference signals (DL-RS). The DL-RS include CRS (also sometimes called common RS) 402 and UE-specific RS (UE-RS) 404. UE-RS 404 are transmitted only on the resource blocks upon which the corresponding PDSCH is mapped. The number of bits carried by each resource element depends on the modulation scheme. Thus, the more resource blocks that a UE receives and the higher the modulation scheme, the higher the data rate for the UE.

Figure 5:
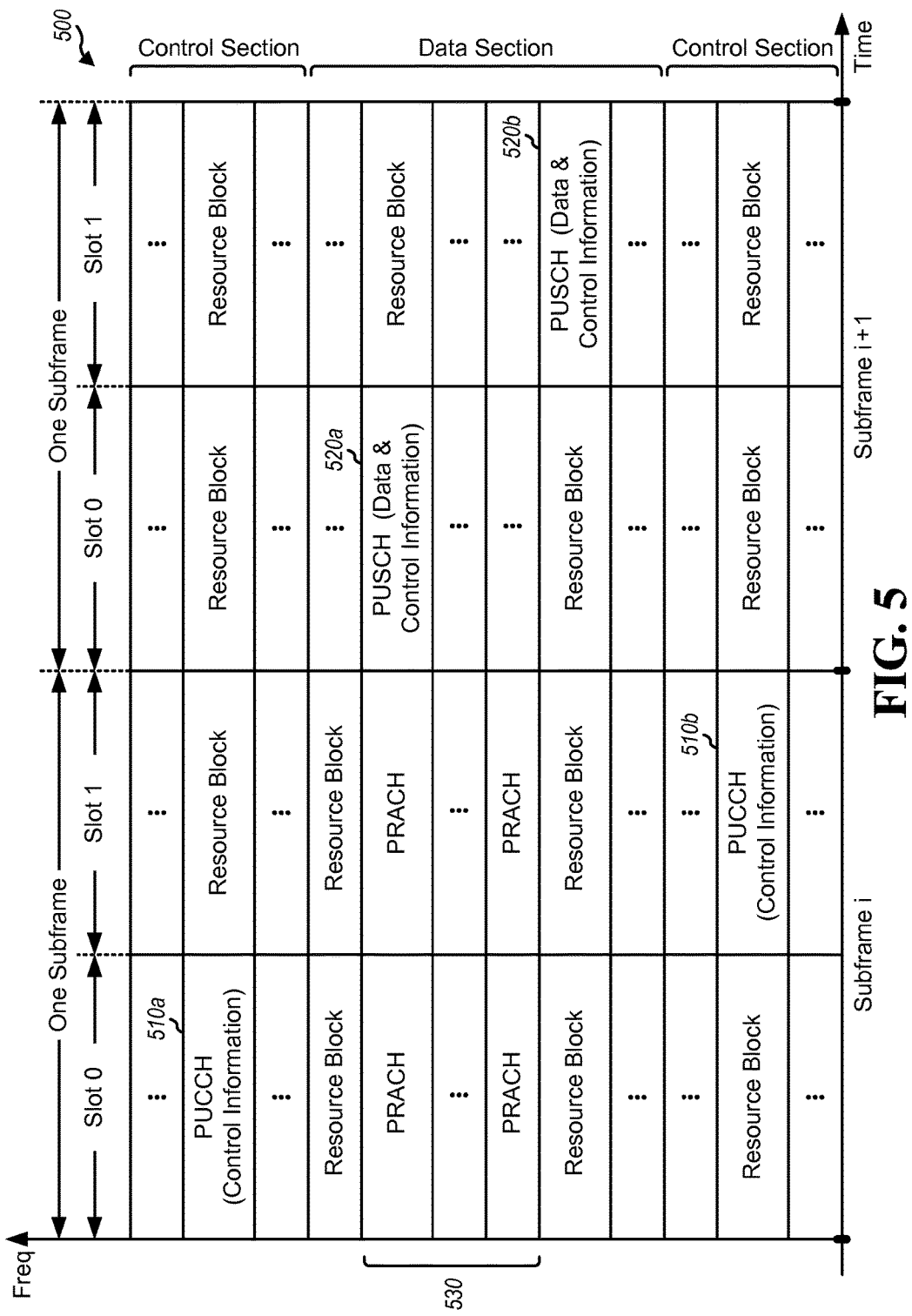
FIG. 5 shows an exemplary format for the UL in LTE.

An example of a UL frame structure 500 will now be presented with reference to FIG. 5. FIG. 5 shows an exemplary format for the UL in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include a portion or all resource blocks not included in the control section. The design in FIG. 5 results in the data section including contiguous subcarriers, which may allow a single UE to be assigned all of the contiguous subcarriers in the data section.

A UE may be assigned resource blocks 510a, 510b in the control section to transmit control information to an eNB. The UE may also be assigned resource blocks 520a, 520b in the data section to transmit data to the eNB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. A UL transmission may span both slots of a subframe and may hop across frequency as shown in FIG. 5.

As shown in FIG. 5, a set of resource blocks may be used to perform initial system access and achieve UL synchronization in a physical random access channel (PRACH) 530. PRACH 530 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) and a UE can make only a single PRACH attempt per frame (10 ms).

Figure 6:
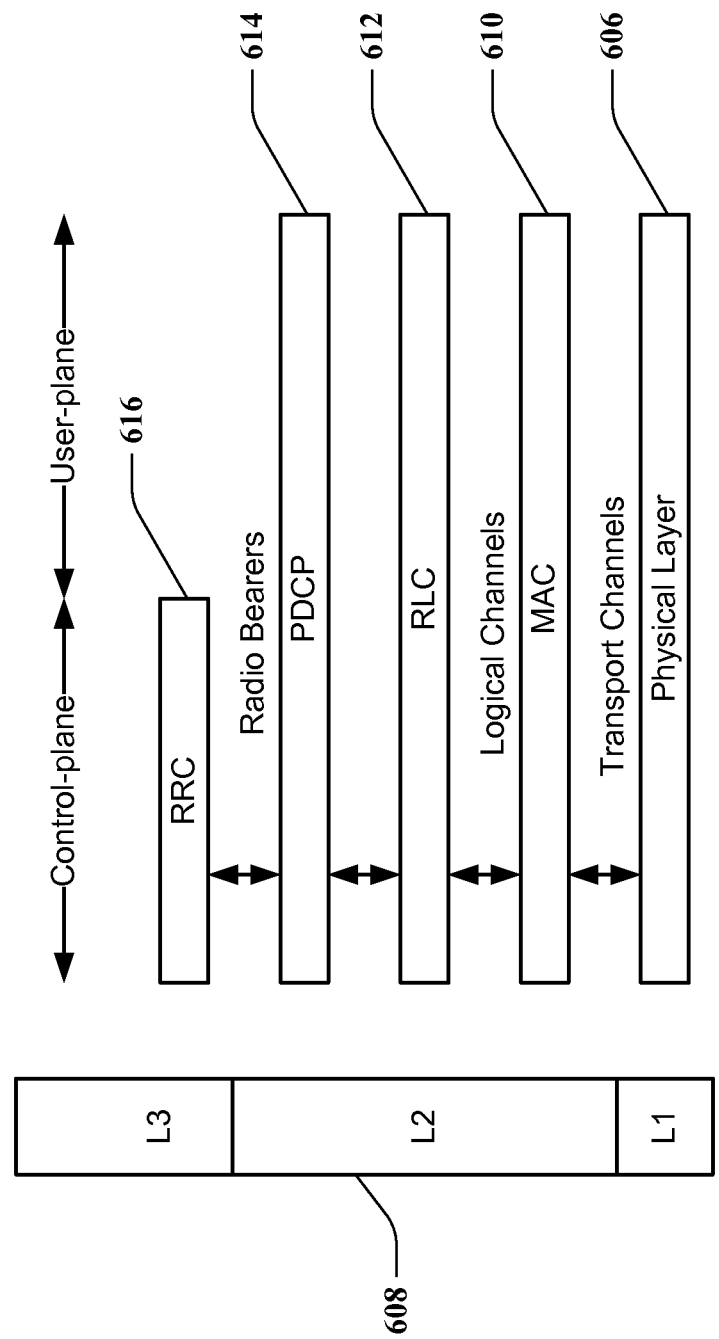
FIG. 6 is a diagram illustrating an example of a radio protocol architecture for the user and control plane.

The radio protocol architecture may take on various forms depending on the particular application. An example system will now be presented with reference to FIG. 6. FIG. 6 is a conceptual diagram illustrating an example of the radio protocol architecture for the user and control planes.

In FIG. 6, the radio protocol architecture for the UE and the eNB is shown with three layers: Layer 1, Layer 2, and Layer 3. Layer 1 is the lowest layer and implements various physical layer signal processing functions. Layer 1 will be referred to herein as physical layer 606. Layer 2 (L2 layer) 608 is above physical layer 606 and is responsible for the link between the UE and eNB over physical layer 606.

In the user plane, L2 layer 608 includes a media access control (MAC) sublayer 610, a radio link control (RLC) sublayer 612, and a packet data convergence protocol (PDCP) 614 sublayer, which terminate at the eNB on the network side. Although not shown, the UE may have several upper layers above L2 layer 608 including a network layer (e.g., IP layer) that terminate at PDN gateway 208 (see FIG. 2) on the network side, and an application layer that terminates at the other end of the connection (e.g., a remote UE, server, etc.).

PDCP sublayer 614 provides multiplexing between different radio bearers and logical channels, and may further include header compression for upper layer data packets to reduce radio transmission overhead, security by ciphering the data packets, and handover support for UEs between eNBs. RLC sublayer 612 include functionality for segmentation and reassembly of upper layer data packets, retransmission of lost data packets, and reordering of data packets to compensate for out-of-order reception due to hybrid automatic repeat request (HARQ). MAC sublayer 610 provides multiplexing between logical and transport channels, and may further include allocation of the various radio resources (e.g., resource blocks) among the UEs, and manage HARQ operations.

In the control plane, the radio protocol architecture for the UE and eNB is substantially the same for the physical layer 606 and the L2 layer 608 with the exception that there is no header compression function for the control plane. The control plane also includes a radio resource control (RRC) sublayer 616 in Layer 3. RRC sublayer 616 is responsible for obtaining radio resources (i.e., radio bearers) and for configuring the lower layers using RRC signaling between the eNB and the UE.

Figure 7:
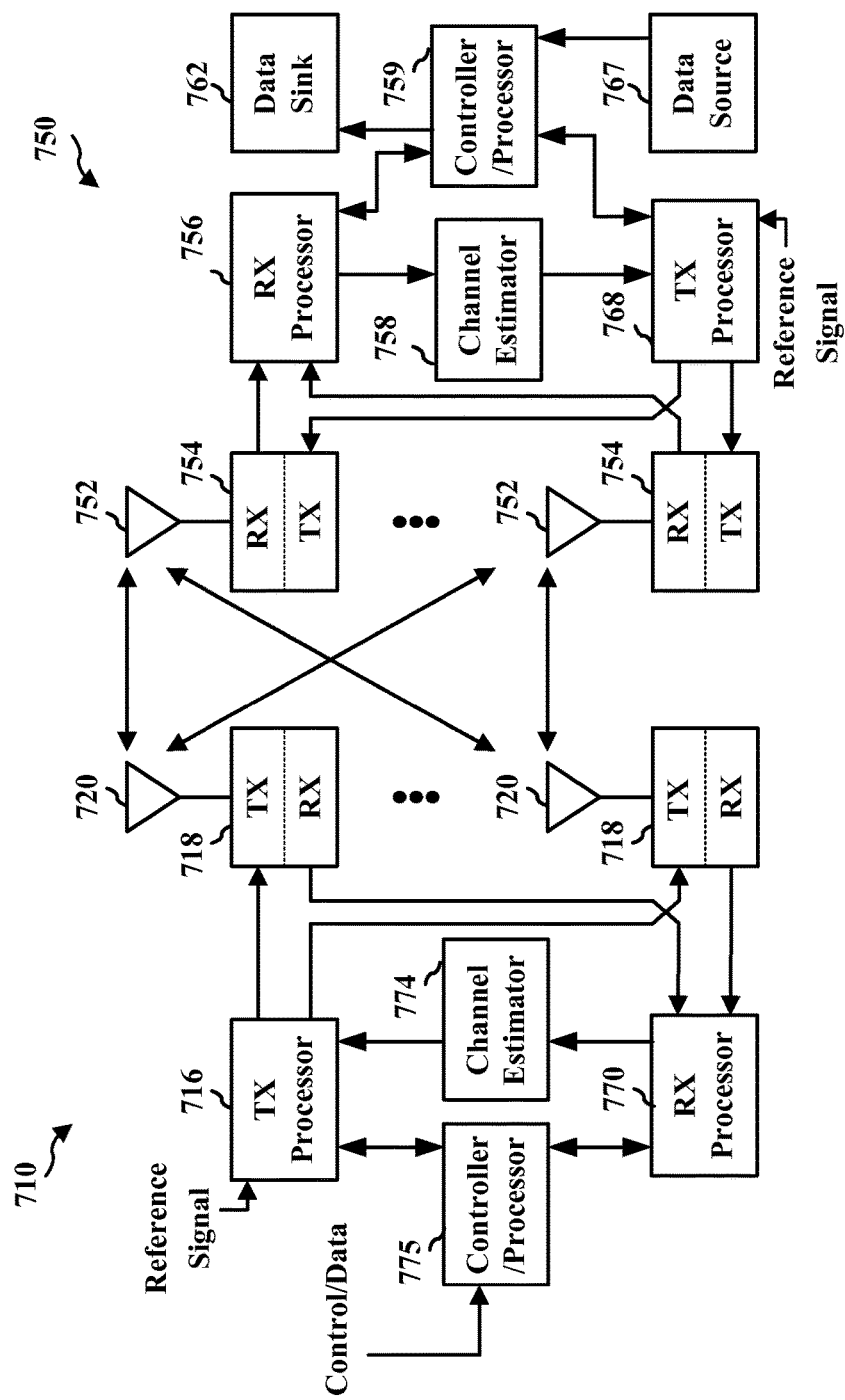
FIG. 7 is a diagram illustrating an example of an evolved Node B and user equipment in an access network.

FIG. 7 is a block diagram of an eNB 710 in communication with a UE 750 in an access network. In the DL, upper layer packets from the core network are provided to a controller/processor 775. controller/processor 775 implements the functionality of the L2 layer described earlier in connection with FIG. 6. In the DL, controller/processor 775 provides functionality including header compression, ciphering, packet segmentation and reordering, multiplexing between logical and transport channels, and radio resource allocations to UE 750 based on various priority metrics, HARQ operations, retransmission of lost packets, and signaling to UE 750.

TX processor 716 implements various signal processing functions for the L1 layer (i.e., physical layer). The signal processing functions include coding and interleaving to facilitate forward error correction (FEC) at UE 750 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 774 may be used to determine the coding and modulation scheme, as well as for spatial processing. The channel estimate may be derived from a reference signal and/or channel condition feedback transmitted by UE 750. Each spatial stream is then provided to a different antenna 720 via a separate transmitter 718TX. Each transmitter 718TX modulates an RF carrier with a respective spatial stream for transmission.

At UE 750, each receiver 754RX receives a signal through its respective antenna 752. Each receiver 754RX recovers information modulated onto an RF carrier and provides the information to receiver (RX) processor 756. RX processor 756 implements various signal processing functions of the L1 layer. RX processor 756 performs spatial processing on the information to recover any spatial streams destined for UE 750. If multiple spatial streams are destined for UE 750, they may be combined by RX processor 756 into a single OFDM symbol stream. RX processor 756 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by eNB 710. These soft decisions may be based on channel estimates computed by the channel estimator 758. The soft decisions are then decoded and deinterleaved to recover the data and control signals that were originally transmitted by eNB 710 on the physical channel. The data and control signals are then provided to controller/processor 759.

Controller/processor 759 implements the L2 layer described earlier in connection with FIG. 6. In the UL, control/processor 759 provide functionality including demultiplexing between transport and logical channels, packet reassembly, deciphering, header decompression, control signal processing to recover upper layer packets from the core network. The upper layer packets are then provided to a data sink 762, which represents all the protocol layers above the L2 layer. Various control signals may also be provided to data sink 762 for L3 processing. Controller/processor 759 is also responsible for error detection using an acknowledgement (ACK) and/or negative acknowledgement (NACK) protocol to support HARQ operations.

In the UL, a data source 767 is used to provide upper layer packets to controller/processor 759. Data source 767 represents all protocol layers above the L2 layer (L2). Similar to the functionality described in connection with the DL transmission by eNB 710, controller/processor 759 implements the L2 layer for the user plane and the control plane by providing header compression, ciphering, packet segmentation and reordering, and multiplexing between logical and transport channels based on radio resource allocations by eNB 710. Controller/processor 759 is also responsible for HARQ operations, retransmission of lost packets, and signaling to eNB 710.

Channel estimates derived by a channel estimator 758 from a reference signal or feedback transmitted by eNB 710 may be used by TX processor 768 to select the appropriate coding and modulation schemes, and to facilitate spatial processing. The spatial streams generated by TX processor 768 are provided to different antenna 752 via separate transmitters 754TX. Each transmitter 754TX modulates an RF carrier with a respective spatial stream for transmission.

The UL transmission is processed at eNB 710 in a manner similar to that described in connection with the receiver function at UE 750. Each receiver 718RX receives a signal through its respective antenna 720. Each receiver 718RX recovers information modulated onto an RF carrier and provides the information to a RX processor 770. RX processor 770 implements the L1 layer.

Controller/processor 759 implements the L2 layer described earlier in connection with FIG. 6. In the UL, control/processor 759 provides demultiplexing between transport and logical channels, packet reassembly, deciphering, header decompression, control signal processing to recover upper layer packets from UE 750. Upper layer packets from controller/processor 775 may be provided to the core network. Controller/processor 759 is also responsible for error detection using an ACK and/or NACK protocol to support HARQ operations.

In one configuration, processing system 114 described in relation to FIG. 1 includes eNB 710. In particular, processing system 114 includes TX processor 716, RX processor 770, and controller/processor 775. In another configuration, processing system 114 described in relation to FIG. 1 includes UE 750. In particular, processing system 114 includes TX processor 768, RX processor 756, and controller/processor 759. According to an exemplary method, an eNB determines, without explicit signaling, whether a UE is able to cancel interference from transmitted CRS, a PDSCH, a PDCCH, or a PCFICH based on a RRM report transmitted by the UE. When the UE is unable to cancel the interference, the UE sends the RRM report including a quality measurement without the interference canceled. When the UE is able to cancel the interference, the UE sends the RRM report including a quality measurement with the interference canceled. According to the exemplary method, the eNB is able to infer UE interference suppression capabilities based on the RRM reports. The exemplary method is described further with respect to FIG. 8.

Figure 8:
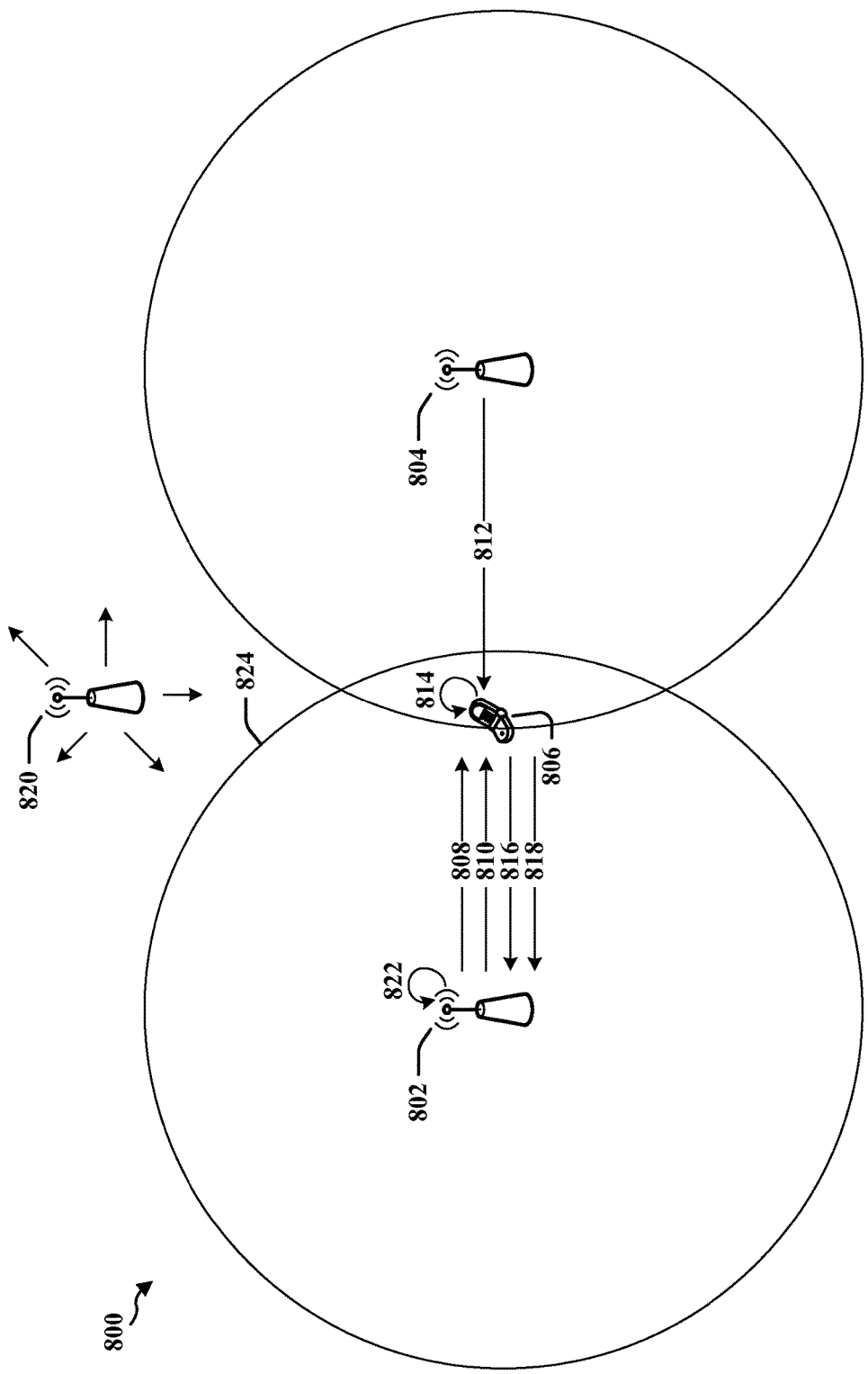
FIG. 8 is a diagram for illustrating an exemplary method.

FIG. 8 is a diagram 800 for illustrating an exemplary method related to the automatic cancelation of interference by a UE without explicitly signaling the capability to the serving eNB. As shown in FIG. 8, UE 806, which is being served by eNB 802, is capable of suppressing CRS, PDSCH, PDCCH, and/or PCFICH interference. UE 806 receives configuration information providing at least one cell identifier in a cell identifier list 808 of cells. UE 806 may then attempt to cancel interference corresponding to the cells in the cell identifier list 808. For example, assuming a cell identifier of neighboring eNB 804 is in cell identifier list 808, UE 806 attempts to detect eNB 804. UE 806 may detect eNB 804 through the use of synchronization signals from eNB 804. In an LTE example, UE 806 may use a primary synchronization signal (PSS) and/or a secondary synchronization signal (SSS) transmitted from eNB 804. If the synchronization signal(s) received from eNB 804 is a weak signal, UE 806 may cancel interference caused by a stronger synchronization signal received from a stronger cell in order to detect eNB 804. In the LTE example, UE 806 may receive the PSS/SSS from eNB 804, and cancel the interfering PSS/SSS from eNB 820 in order to detect the PSS/SSS from eNB 804. If UE 806 is unable to detect eNB 804 through a PSS/SSS transmitted by eNB 804, UE 806 may detect eNB 804 based on positioning reference signals (PRS) from eNB 804.

Alternatively, UE 806 may detect eNB 804 through a broadcast channel (e.g., in LTE, using the physical broadcast channel (PBCH)) transmitted by eNB 804. In such a configuration, if the PBCH received from eNB 804 is a weak signal, UE 806 may cancel interference from a stronger PBCH received from another cell in order to detect eNB 804. For example, UE 806 may receive the PBCH from eNB 804 and cancel the interfering PBCH received from eNB 820.

In yet another alternative, rather than detect eNB 804 based on a PBCH transmitted directly from eNB 804, UE

806 may detect eNB 804 based on a PBCH received by eNB 802. In such a configuration, eNB 802 may receive the PBCH corresponding to eNB 804 through a tunneling scheme, whereby eNB 802 transmits the PBCH of eNB 804 to UE 806.

After UE 806 detects eNB 804, the UE can cancel interference caused by signal 812 from signal 810. Signals 810, 812 may be CRS, a PDSCH, a PDCCH, or a PCFICH. UE 806 may receive configuration information identifying the type of signals on which to perform interference cancellation. For example, UE 806 may be configured to suppress interference for received CRS, but not received PDSCH, PDCCH, or PCFICH. The UE determines 814 a received signal received power (RSRP) of signal 810. After canceling the interference from signal 812 from signal 810, UE 806 may also determine 814 a received signal received quality (RSRQ) of signal 810. The RSRQ measurement may correspond to signals received in resources on which UE 806 is configured to communicate. The RSRQ measurement may correspond to signals received in resources on which UE 806 is not configured to communicate, such as all DL resources and/or multiple sets of resources. The RSRQ is equal to a received signal received power (RSRP) divided by a received signal strength indicator (RSSI). The interference cancelation affects the RSSI value. After determining the RSRQ, UE 806 transmits an RRM report 816 including the RSRQ of received signal 810 without the interference 812. The UE also transmits the RSRP of received signal 810 and the RSRP of interfering signal 812. UE 806 may also transmit an RRM report 818 including the RSRQ of signal 810 with interference 812.

As discussed supra, signals 810, 812 may be PDCCH or PCFICH. The signals PDCCH/PCFICH may be used to schedule paging information, system information, or other information. If signals 810, 812 are PDCCH or PCFICH, eNB 802 will transmit, to UE 806, at least one of a radio network temporary identifier (RNTI) for each radio network from which the PDCCH/PCFICH is received, a control channel element (CCE) aggregation level, and a relative power ratio between resource elements (REs) used for the PDCCH/PCFICH and REs used for reference signals. Based on the received information, UE 806 may cancel interference caused by signal 812 from received signal 810. If the interference is caused by individual data, the interference may be suppressed through spatial techniques.

eNB 802 may receive RRM report 816. Based on RRM report 816, eNB 802 determines whether UE 806 is capable of canceling interference 812 and determines 822 whether to serve UE 806. For example, eNB 802 may compare the RSRP of signal 810 to the RSRP of interfering signal 812. When the RSRP of interfering signal 812 from neighboring eNB 804 is greater than the RSRP of the signal 810 from serving eNB 802 and the RSRQ of signal 810 is greater than zero, eNB 802 is able to infer that UE 806 is capable of canceling the interfering signal 812 from signal 810. If UE 806 is able to cancel interference 812, eNB 802 may determine to continue serving UE 806 even when UE 806 is on cell edge 824. As such, when eNB 802 determines that UE 806 is capable of suppressing CRS, PDSCH, PDCCH, and/or PCFICH interference, eNB 802 may be able to serve UE 806 when UE 806 is farther away from eNB 802.

Figure 9:
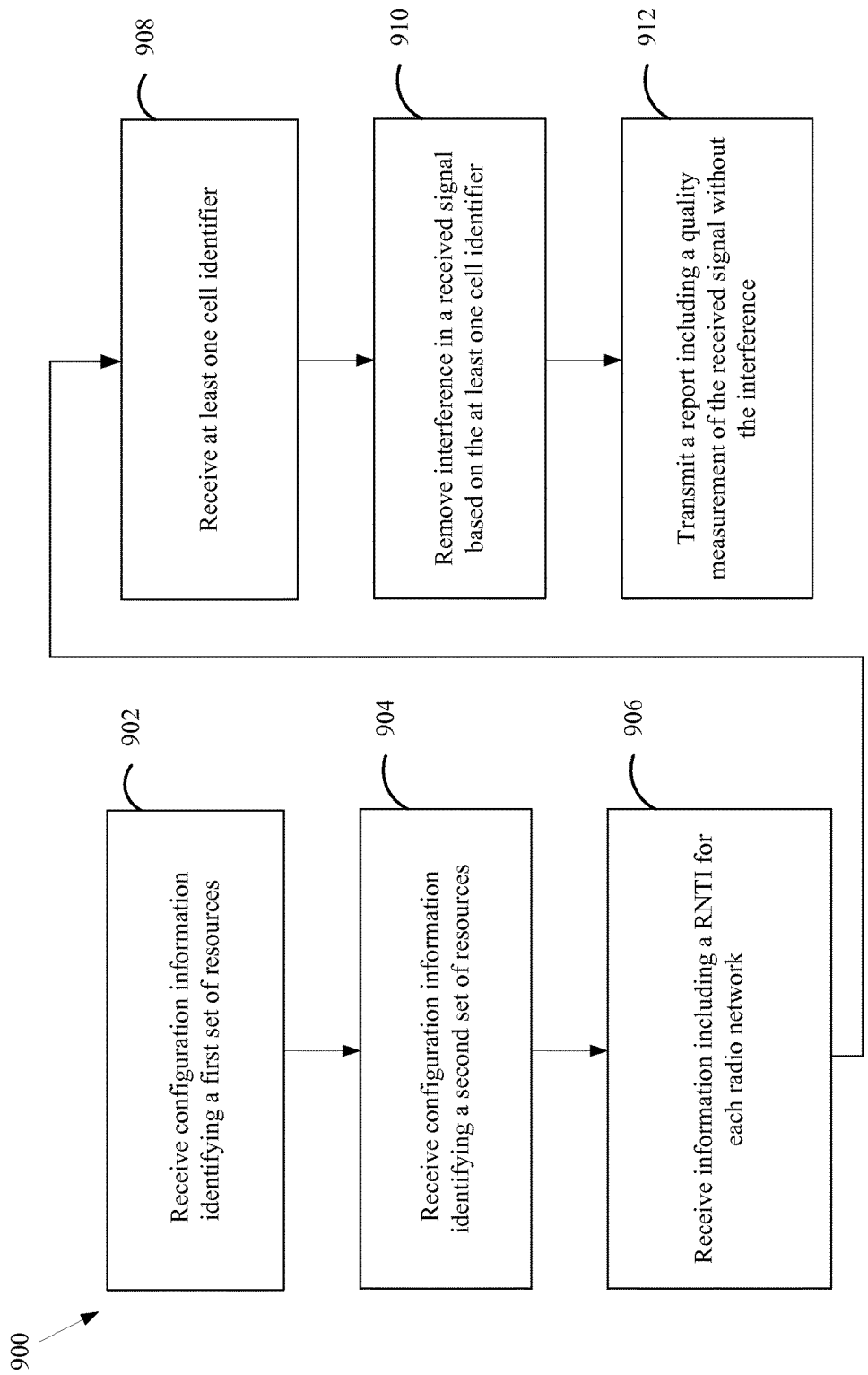
FIG. 9 is a flow chart of a first method of wireless communication.

FIG. 9 is a flow chart 900 of a first method related to the automatic cancelation of interference by a UE without explicitly signaling the capability to the serving eNB. The method is performed by a UE, such as UE 806. According to the method, the UE receives configuration information identifying a first set of resources for transmitting (902). The UE may also receive configuration information indicating that the UE is to provide quality measurements on a second set of resources on which the UE may not transmit (904). The second set of resources may include some or all DL resources and/or multiple sets of resources. If the UE is to suppress PDCCH/PCFICH interference, the UE also receives configuration information which includes an RNTI for each radio network from which to suppress the PDCCH/PCFICH interference (906). The configuration information may include a CCE aggregation level, and a relative power ratio between REs used for the PDCCH/PCFICH and REs used for reference signals. The UE receives at least one cell identifier from the serving eNB (908). Each cell identifier corresponds to a cell from which interference should be canceled. The UE removes, from a received signal, interference received from cells corresponding to one or more of the at least one cell identifier (910). Then, the UE transmits a report including a quality measurement of the received signal without the interference (912). The quality measurement corresponds to signals received over the first set of resources and, if the UE is configured to provide the quality measurement on the second set of resources, for signals received over the second set of resources (912).

Figure 10:
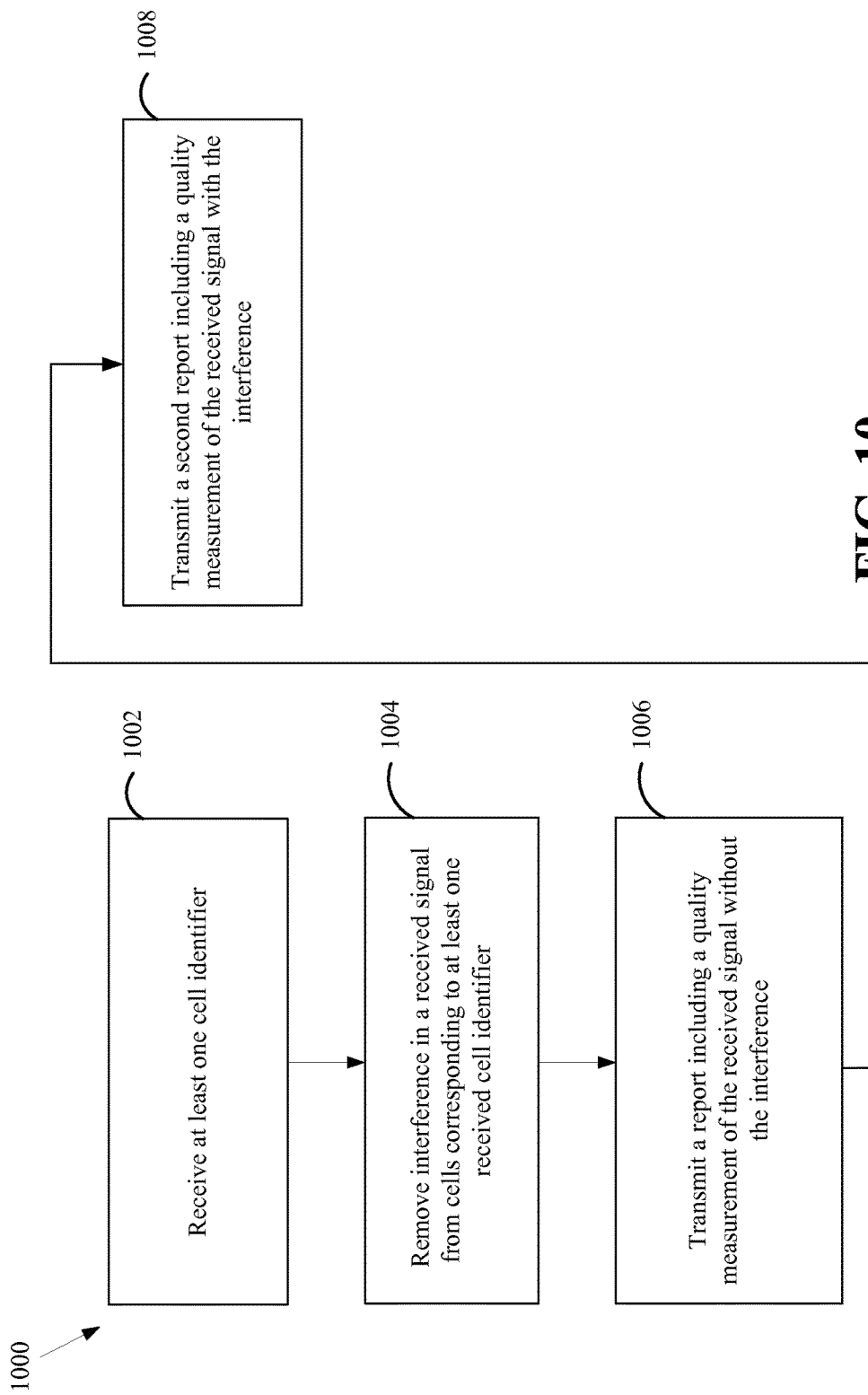
FIG. 10 is a flow chart of a second method of wireless communication.

FIG. 10 is a flow chart 1000 of a second method related to the automatic cancellation of interference by a UE without explicitly signaling the capability to the serving eNB. The method is performed by a UE, such as the UE 806. According to the method, the UE receives at least one cell identifier (1002). Each cell identifier corresponds to a cell from which interference should be canceled. The UE cancels or suppresses interference, in the received signal, from cells corresponding to one or more of the at least one cell identifier (1004). Then, the UE transmits a report including a quality measurement of the received signal without the interference (1006). The UE may also transmit a second report including a quality measurement of the received signal with the interference (1008).

Figure 11:
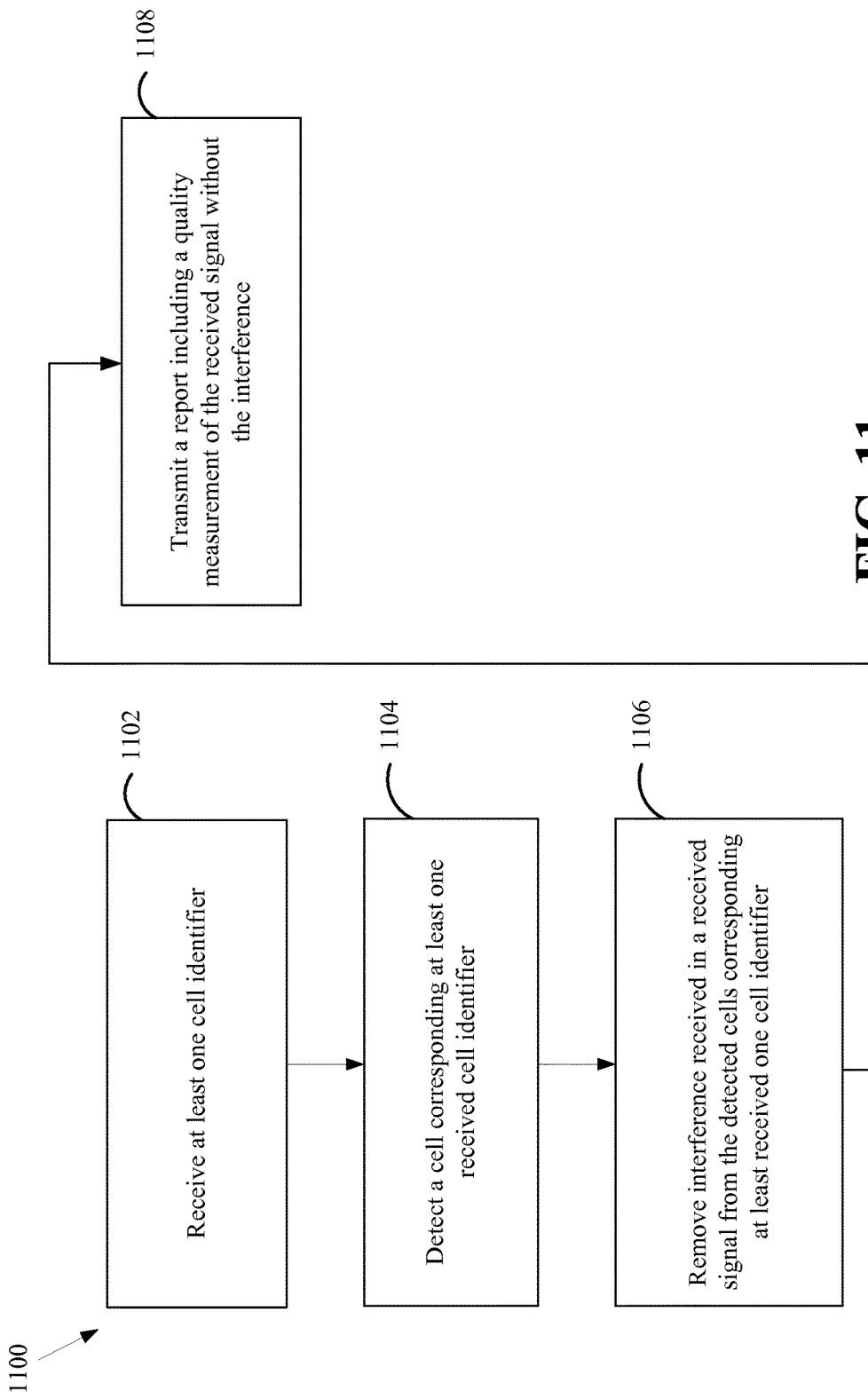
FIG. 11 is a flow chart of a third method of wireless communication.

FIG. 11 is a flow chart 1100 of a third method of wireless communication. The method is performed by a UE, such as UE 806. According to the method, the UE receives at least one cell identifier (1102). Each cell identifier corresponds to a cell from which interference should be canceled. The UE detects a cell corresponding to one of the at least one cell identifier. This detection may be performed through received PSS/SSS, PRS, or PBCH (1104). Then, the UE cancels or suppresses interference, in a received signal, from the detected cells corresponding to one or more of the at least one cell identifier (1106). Then, the UE transmits a report including a quality measurement of the received signal without the interference (1108).

In one configuration, the UE receives at least one synchronization signal (e.g., a PSS or a SSS) from a cell corresponding to one of the at least one cell identifier. In addition, the UE may cancel interference caused by an additionally received synchronization signal. When unable to detect a cell using synchronization signaling, the UE may detect a cell corresponding to one of the at least one cell identifier based on PRS. In an alternative configuration, the UE receives a PBCH from a cell corresponding to one of the at least one cell identifier. In addition, the UE may cancel or suppress interference caused by an additionally received PBCH in order to detect the cell. In further configurations, the UE may detect a cell corresponding to one of the at least one cell identifier based on a PBCH of a neighbor cell received from a serving cell.

Figure 12:
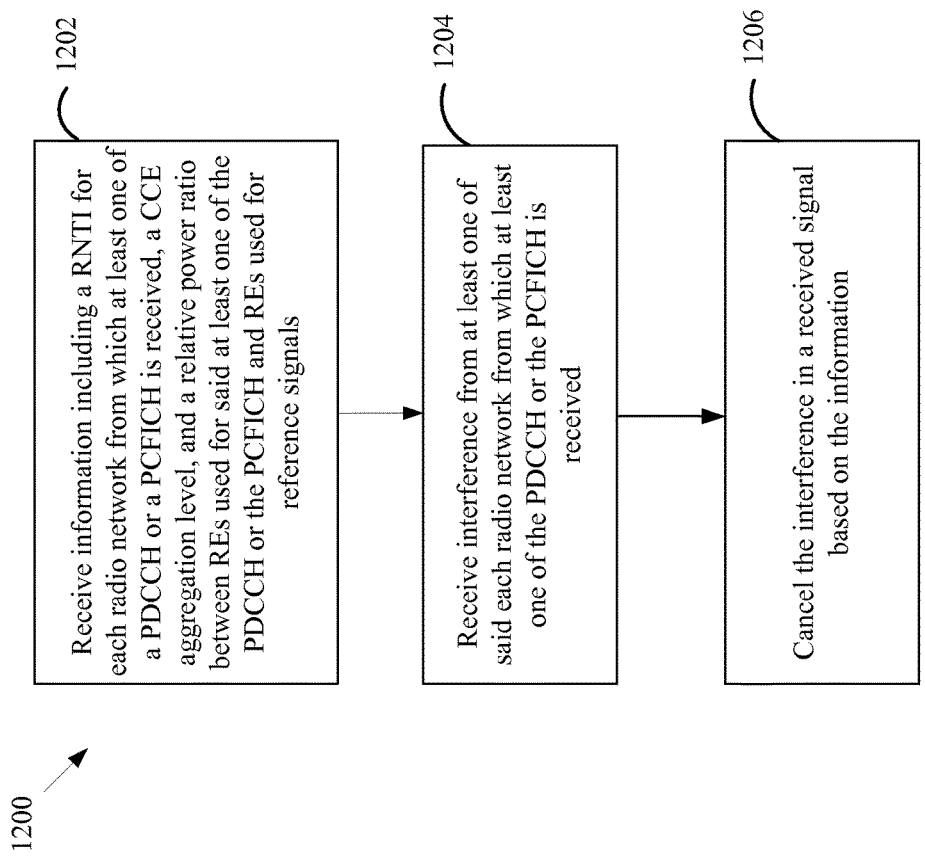
FIG. 12 is a flow chart of a fourth method of wireless communication.

FIG. 12 is a flow chart 1200 of a fourth method of wireless communication. The method is performed by a UE, such as UE 806. According to the method, the UE receives information that may include at least one of an RNTI for each radio network from which at least one of a PDCCH or a PCFICH is received, a CCE aggregation level, and a relative power ratio between REs used for said at least one of the PDCCH or the PCFICH and REs used for reference signals (1202). The UE receives interference from at least one of said each radio network from which at least one of the PDCCH or the PCFICH is received (1204). The UE cancels the interference in a received signal (i.e., a PDCCH and/or PCFICH signal received from a serving eNB) based on the information (1206).

Figure 13:
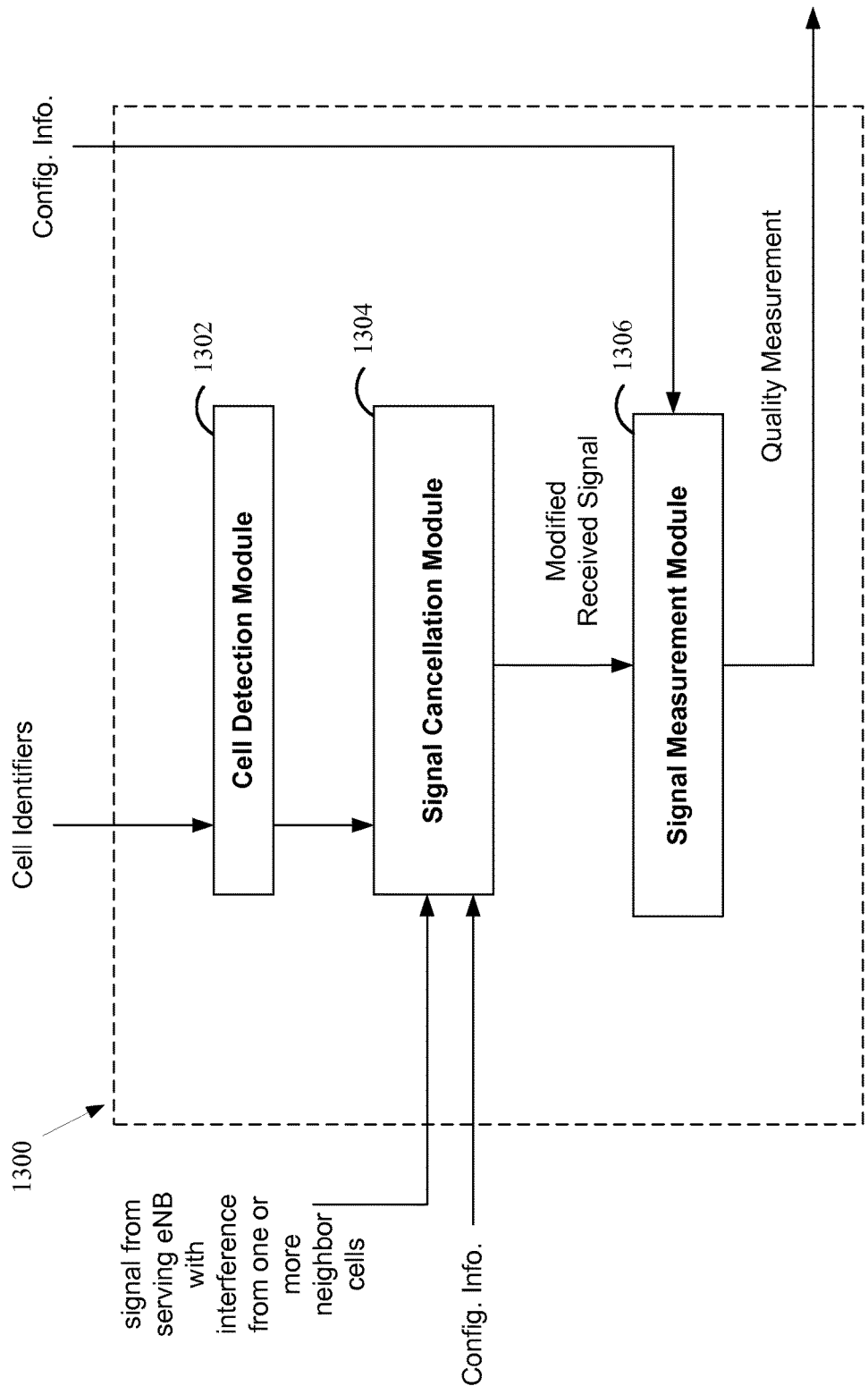
FIG. 13 is a conceptual block diagram illustrating the functionality of a first exemplary apparatus.

FIG. 13 is a conceptual block diagram 1300 illustrating the functionality of a first exemplary apparatus 100. The apparatus 100, which may be a UE, includes a module 1302 that detects interfering cells. The cell detection module 1302 detects the cells associated with the cell identifiers provided by the eNB. The signal cancellation module 1304 receives the signal from the serving eNB. The signal from the serving eNB includes interference from one or more neighboring cells. The signal cancelation module 1304 cancels, removes, or otherwise suppresses the interference from the neighboring cells detected by the cell detection module 1302. The signal cancelation module 1304 may receive configuration information to enable to interference suppression. For example, when the received signal is one of a PDCCH or a PCFICH, the signal cancelation module 1304 may receive information including an RNTI for each radio network from which at least one of a PDCCH or a PCFICH is received, a CCE aggregation level, and a relative power ratio between REs used for said at least one of the PDCCH or the PCFICH and REs used for reference signals. The signal measurement module 1306 receives the modified received signal and provides a quality measurement. The quality measurement is for a set of resources configured based on received configuration information. Apparatus 100 may include additional modules that perform each of the steps in the aforementioned flow charts FIGS. 9-12. As such, each step in the aforementioned flow charts FIGS. 9-12 may be performed by a module and apparatus 100 may include one or more of those modules.

Figure 14:
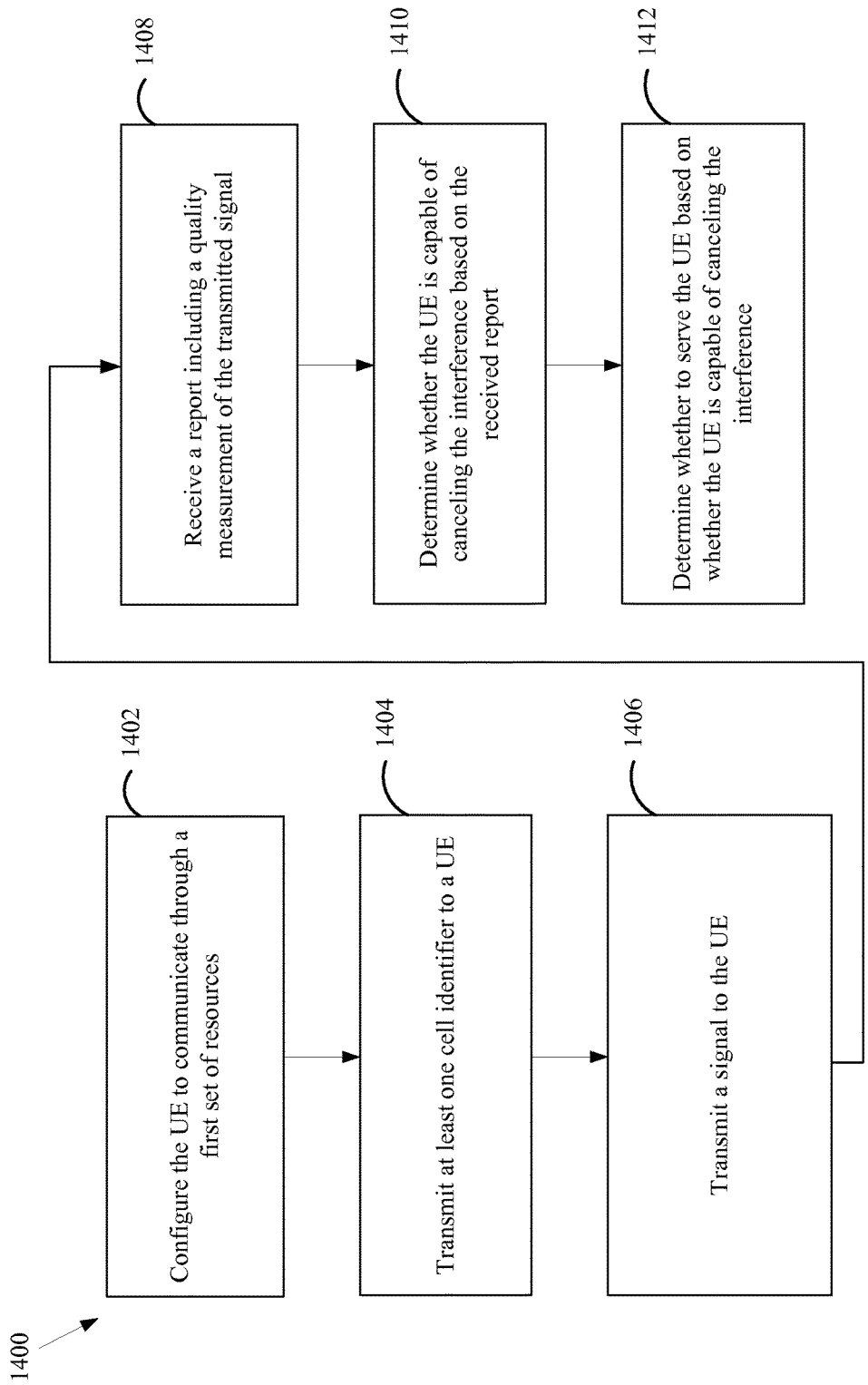
FIG. 14 is a flow chart of a fifth method of wireless communication.

FIG. 14 is a flow chart 1400 of a fifth method of wireless communication. The method is performed by an eNB, such as eNB 802. According to the method, the eNB configures the UE to communicate through a first set of resources (1402). The eNB transmits at least one cell identifier to a UE (1404). Each cell identifier corresponds to a cell from which interference should be canceled. The eNB transmits a signal to the UE (1406). The signal may be at least one of a CRS, a PDSCH, a PDCCH, or a PCFICH. The eNB receives a report including a quality measurement of the transmitted signal (1408). The quality measurement may correspond to signals transmitted in the first set of resources. The eNB then determines whether the UE is capable of canceling the interference based on the received report (1410). The eNB may then determine whether to serve the UE based on whether the UE is capable of canceling the interference (1412).

The quality measurement may be an RSRQ measurement and the report may be an RRM report. The eNB may configure the UE to provide the quality measurement on a second set of resources without having configured the UE to communicate through the second set of resources. In such a configuration, the quality measurement is also for signals transmitted in the second set of resources. When the interference is at least one of a PDCCH or a PCFICH, the eNB may also transmit to the UE information including an RNTI for each radio network from which the PDCCH/PCFICH is received by the UE, a CCE aggregation level, and a relative power ratio between REs used for the PDCCH/PCFICH and REs used for reference signals. The eNB may also receive a second report including a quality measurement of the transmitted signal with the interference.

Figure 15:
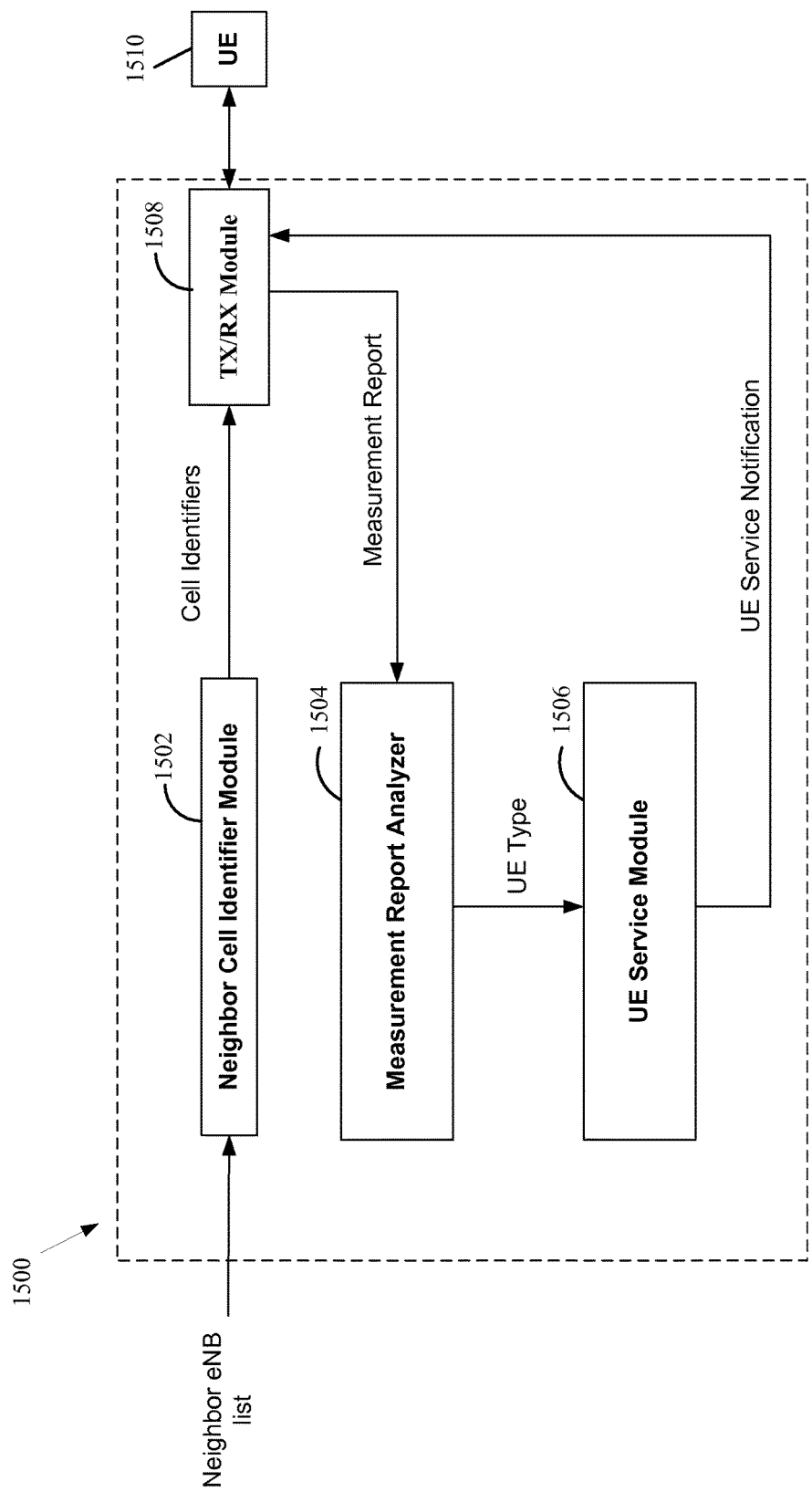
FIG. 15 is a conceptual block diagram illustrating the functionality of a second exemplary apparatus.

FIG. 15 is a conceptual block diagram 1500 illustrating the functionality of a third exemplary apparatus 100. Apparatus 100, which may be an eNB, includes neighbor cell identifier module 1502 that receives a neighbor eNB list and identifies cells from which a UE should cancel interference. The cell identifiers associated with the identified cells are provided to Tx/Rx module 1508, which provides the cell identifiers to UE 1510. Tx/Rx module 1508 receives from UE 1510 a measurement report. Measurement report analyzer 1504 receives the measurement report and determines whether UE 1510 is capable of canceling, removing, or otherwise suppressing the interference from the identified cells based on the measurement report. UE service module 1506 determines whether to serve UE 1510 based on whether UE 1510 is capable of canceling the interference.

Referring to FIG. 1 and FIG. 7, in one configuration, apparatus 100 for wireless communication includes means for receiving at least one cell identifier. Each cell identifier corresponds to a cell from which interference should be canceled. Apparatus 100 further includes means for removing, from a received signal, interference received from cells corresponding to one or more of the at least one cell identifier. Apparatus 100 further includes means for transmitting a report comprising a quality measurement of the received signal without the interference. Apparatus 100 may further include means for receiving configuration information. The configuration information identifies a first set of resources for quality measurement and communication. Apparatus 100 may further include means for receiving second configuration information. The second configuration information identifies a second set of resources for quality measurement. In one configuration, the interference is at least one of the PDCCH or the PCFICH; apparatus 100 further includes means for receiving information including an RNTI for each radio network from which the PDCCH/PCFICH is received, a CCE aggregation level, and a relative power ratio between REs used for the PDCCH/PCFICH and REs used for reference signals; and the interference is removed from the received signal based on the received information. Apparatus 100 may further include means for transmitting a second report comprising a quality measurement of the received signal with the interference. Apparatus 100 may further include means for receiving at least one synchronization signal from a cell corresponding to one of the at least one cell identifier, means for removing interference of an additionally received synchronization signal from the received at least one synchronization signal, and means for detecting the cell based on the at least one synchronization signal without the interference corresponding to the additionally received synchronization signal. Apparatus 100 may further include means for detecting a cell corresponding to one of the at least one cell identifier based on PRS. Apparatus 100 may further include means for receiving a PBCH from a cell corresponding to one of the at least one cell identifier, means for removing interference of an additionally received PBCH from the received PBCH, and means for detecting the cell based on the PBCH without the interference of the additionally received PBCH. Apparatus 100 may further include means for detecting a cell corresponding to one of the at least one cell identifier based on a PBCH of a neighbor cell received from a serving cell. The aforementioned means is processing system 114 configured to perform the functions recited by the aforementioned means. As described supra, the processing system 114 includes TX Processor 768, RX Processor 756, and controller/processor 759. As such, in one configuration, the aforementioned means may be TX Processor 768, RX Processor 756, and controller/processor 759 configured to perform the functions recited by the aforementioned means.

In one configuration, apparatus 100 for wireless communication includes means for transmitting at least one cell identifier to a UE. Each cell identifier corresponds to a cell from which interference should be canceled. Apparatus 100 further includes means for transmitting a signal to the UE. Apparatus 100 further includes means for receiving a report comprising a quality measurement of the transmitted signal. Apparatus 100 further includes means for determining whether the UE is capable of canceling the interference based on whether the quality measurement of the transmitted signal corresponds to the transmitted signal without interference. Apparatus 100 may further include means for determining whether to serve the UE based on whether the UE is capable of canceling the interference. Apparatus 100 may further include means for configuring the UE to communicate through a first set of resources. In such a configuration, the quality measurement is for signals transmitted in the first set of resources. Apparatus 100 may further include means for configuring the UE to provide the quality measurement on a second set of resources without having configured the UE to communicate through the second set of resources. In such a configuration, the quality measurement is also for signals transmitted in the second set of resources. In one configuration, the interference is at least one of the PDCCH or the PCFICH, and apparatus 100 further includes means for transmitting information including an RNTI for each radio network from which the PDCCH/PCFICH is received by the UE, a CCE aggregation level, and a relative power ratio between REs used for the PDCCH/PCFICH and REs used for reference signals. Apparatus 100 may further include means for receiving a second report comprising a quality measurement of the transmitted signal with the interference. The aforementioned means is processing system 114 configured to perform the functions recited by the aforementioned means. As described supra, processing system 114 includes TX Processor 716, RX Processor 770, and controller/processor 775. As such, in one configuration, the aforementioned means may be TX Processor 716, RX Processor 770, and controller/processor 775 configured to perform the functions recited by the aforementioned means.

In one configuration, apparatus 100 for wireless communication includes means for receiving information including an RNTI for each radio network from which at least one of a PDCCH or a PCFICH is received, a CCE aggregation level, and a relative power ratio between REs used for said at least one of the PDCCH or the PCFICH and REs used for reference signals. Apparatus 100 further includes means for canceling interference based on the information. The aforementioned means is processing system 114 configured to perform the functions recited by the aforementioned means. As described supra, processing system 114 includes TX Processor 768, RX Processor 756, and controller/processor 759. As such, in one configuration, the aforementioned means may be TX Processor 768, RX Processor 756, and controller/processor 759 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication at a user equipment (UE), comprising:
   receiving, from a serving cell, a list of cell identifiers corresponding to at least one neighboring cell from which interference should be canceled from a cell-specific reference signal (CRS) on an identified first set of resources;
   removing, from a received CRS, interference received from the at least one neighboring cell corresponding to one or more of the cell identifiers on the identified first set of resources;
   transmitting a report, the report comprising a quality measurement of the received CRS without the interference, wherein the quality measurement corresponds to a measurement of the first set of resources in the received CRS;
   receiving at least one synchronization signal from a cell corresponding to one of the cell identifiers; and
   removing interference corresponding to an additionally received synchronization signal from the received at least one synchronization signal.

2. The method of claim 1, further comprising receiving configuration information, the configuration information identifying the first set of resources for quality measurement and communication.

3. The method of claim 2, further comprising receiving second configuration information, the second configuration information identifying a second set of resources for quality measurement;
   wherein the report further comprises a second quality measurement corresponding to the second set of resources in the received CRS.

4. The method of claim 3, wherein the second set of resources is not configured for communication.

5. The method of claim 1, wherein the interference comprises at least one of a reference signal, a downlink shared channel, a downlink control channel, or a control format indicator channel.

6. The method of claim 5, further comprising receiving, from the serving cell, information comprising at least one of a network identifier for each radio network from which the downlink control channel or control format indicator channel is received, a control channel element aggregation level, and a relative power ratio between resource elements used for the downlink control channel or control format indicator channel and resource elements used for reference signals;
  wherein the interference is removed from the received CRS based on the received information, and the interference comprises at least one of the downlink control channel or the control format indicator channel.

7. The method of claim 1, further comprising transmitting a second report comprising a quality measurement of the received CRS with the interference.

8. The method of claim 1, further comprising:
  detecting the cell based on the at least one synchronization signal without the interference corresponding to the additionally received synchronization signal.

9. The method of claim 1, further comprising detecting a cell corresponding to one of the cell identifiers based on reference signals.

10. The method of claim 1, further comprising:
  receiving a broadcast channel from a cell corresponding to one of the cell identifiers;
  removing interference of an additionally received broadcast channel from the received broadcast channel in order to detect the cell; and
  detecting the cell based on the broadcast channel without the interference of the additionally received broadcast channel.

11. The method of claim 1, further comprising detecting a cell corresponding to one of the cell identifiers based on a broadcast channel of a neighbor cell received from the serving cell.

12. An apparatus for wireless communication at a user equipment (UE), comprising:
  means for receiving, from a serving cell, a list of cell identifiers corresponding to at least one neighboring cell from which interference should be canceled from a cell-specific reference signal (CRS) on an identified first set of resources;
  means for removing, from a received CRS, interference received from the at least one neighboring cell corresponding to one or more of the cell identifiers on the identified first set of resources;
  means for transmitting a report, the report comprising a quality measurement of the received CRS without the interference, wherein the quality measurement corresponds to a measurement of the first set of resources in the received CRS;
  means for receiving at least one synchronization signal from a cell corresponding to one of the cell identifiers; and
  means for removing interference corresponding to an additionally received synchronization signal from the received at least one synchronization signal.

13. The apparatus of claim 12, further comprising means for receiving configuration information, the configuration information identifying the first set of resources for quality measurement and communication.

14. The apparatus of claim 13, further comprising means for receiving second configuration information, the second configuration information identifying a second set of resources for quality measurement;
  wherein the report further comprises a second quality measurement corresponding to the second set of resources in the received CRS.

15. The apparatus of claim 12, further comprising means for transmitting a second report comprising a quality measurement of the received CRS with the interference.

16. The apparatus of claim 12, further comprising:
  means for detecting the cell based on the at least one synchronization signal without the interference corresponding to the additionally received synchronization signal.

17. The apparatus of claim 12, further comprising means for detecting a cell corresponding to one of the cell identifiers based on reference signals.

18. The apparatus of claim 12, further comprising means for detecting a cell corresponding to one of the cell identifiers based on a broadcast channel of a neighbor cell received from the serving cell.

19. An apparatus for wireless communication at a user equipment (UE), comprising:
  a memory; and
  at least one processor coupled to the memory and configured to:
    receive, from a serving cell, a list of cell identifiers corresponding to at least one neighboring cell from which interference should be canceled from a cell-specific reference signal (CRS) on an identified first set of resources;
    remove, from a received CRS, interference received from the at least one neighboring cell corresponding to one or more of the cell identifiers on the identified first set of resources;
    transmit a report, the report comprising a quality measurement of the received CRS without the interference, wherein the quality measurement corresponds to a measurement of the first set of resources in the received CRS;
    receive at least one synchronization signal from a cell corresponding to one of the cell identifiers; and
    remove interference corresponding to an additionally received synchronization signal from the received at least one synchronization signal.

20. The apparatus of claim 19, the at least one processor further configured to receive configuration information, the configuration information identifying the first set of resources for quality measurement and communication.

21. The apparatus of claim 20, the at least one processor further configured to receive second configuration information, the second configuration information identifying a second set of resources for quality measurement;
  wherein the report further comprises a second quality measurement corresponding to the second set of resources in the received CRS.

22. The apparatus of claim 19, wherein the interference comprises at least one of a reference signal, a downlink shared channel, a downlink control channel, or a control format indicator channel.

23. The apparatus of claim 22, the at least one processor further configured to receive, from the serving cell, information comprising at least one of a network identifier for each radio network from which the downlink control channel or control format indicator channel is received, a control channel element aggregation level, and a relative power ratio between resource elements used for the downlink control channel or control format indicator channel and resource elements used for reference signals;
  wherein the interference is removed from the received CRS based on the received information, and the interference comprises at least one of the downlink control channel or the control format indicator channel.

24. The apparatus of claim 19, the at least one processor further configured to:

detect the cell based on the at least one synchronization signal without the interference corresponding to the additionally received synchronization signal.

25. The apparatus of claim 19, the at least one processor further configured to:
receive a broadcast channel from a cell corresponding to one of the cell identifiers;
remove interference of an additionally received broadcast channel from the received broadcast channel in order to detect the cell; and
detect the cell based on the broadcast channel without the interference of the additionally received broadcast channel.

\* \* \* \* \*